No. 716,256. Patented Dec. 16, 1902.
J. B. LOCKE.
MILK PAIL.
(Application filed Feb. 8, 1902.)
(No Model.) 2 Sheets—Sheet 1.
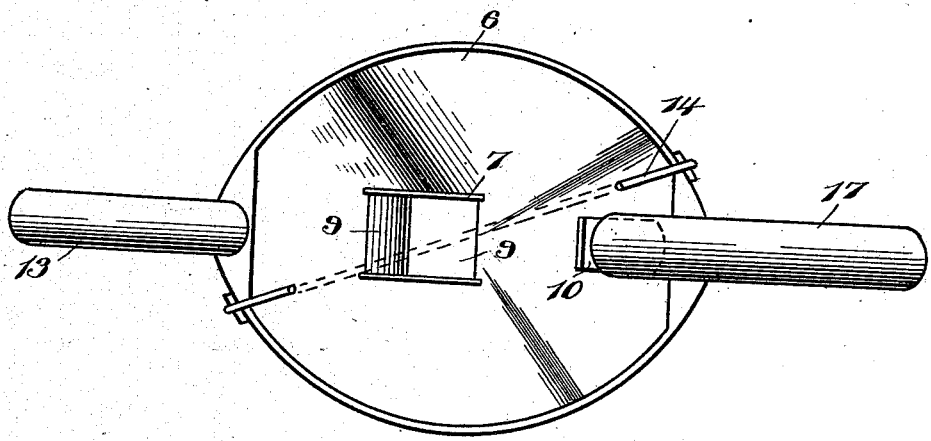
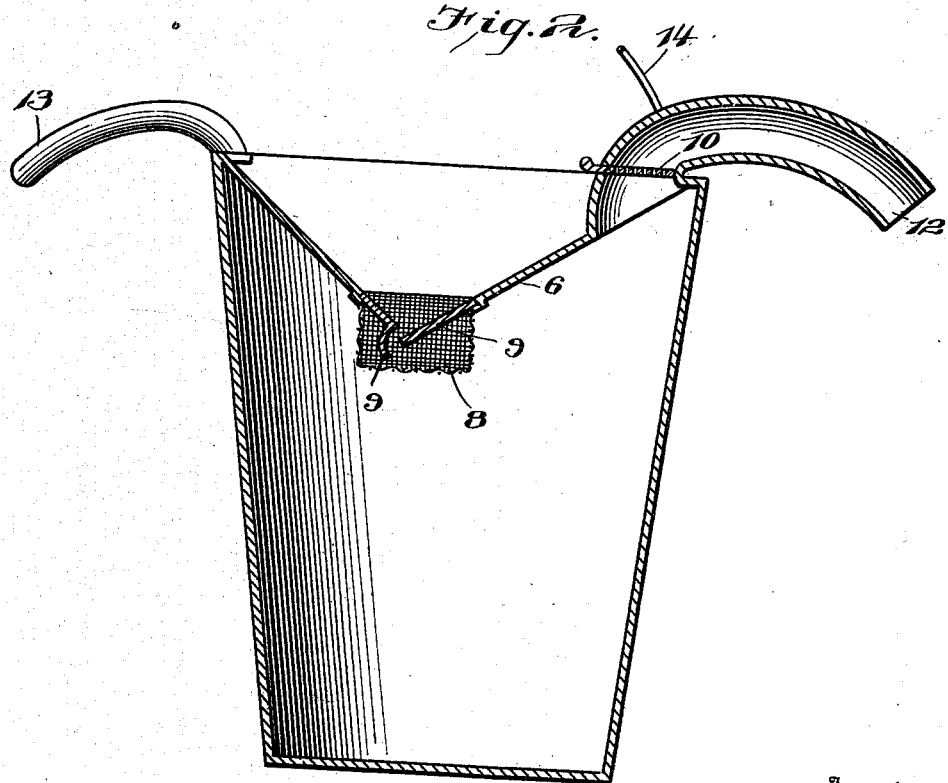

No. 716,256. Patented Dec. 16, 1902.
J. B. LOCKE.
MILK PAIL.
(Application filed Feb. 8, 1902.)
(No Model.) 2 Sheets—Sheet 2.
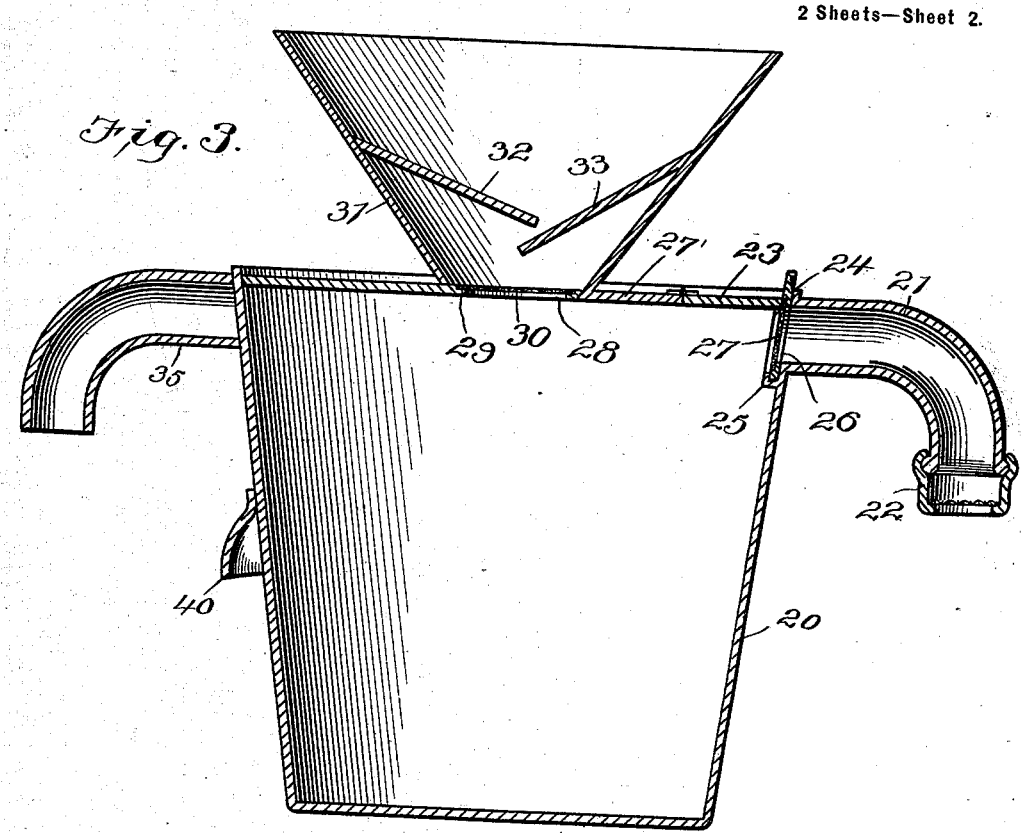
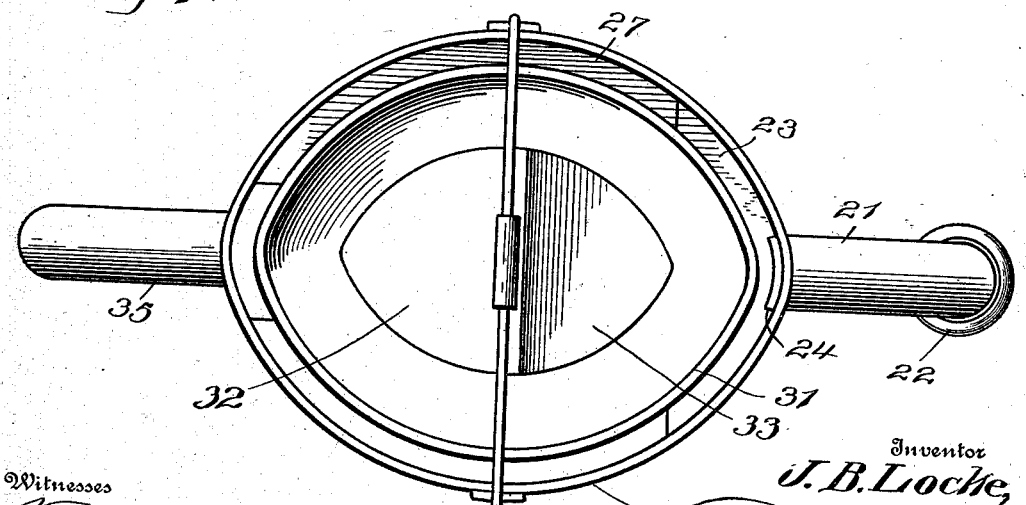
Witnesses
J. P. Britt
Harry E. M. Chandler
Inventor
J. B. Locke,
By Chandler & Chandler
Attorneys

UNITED STATES PATENT OFFICE.

JOSEPH B. LOCKE, OF PORTSMOUTH, NEW HAMPSHIRE.

MILK-PAIL.

SPECIFICATION forming part of Letters Patent No. 716,256, dated December 16, 1902.

Application filed February 8, 1902. Serial No. 93,222. (No model.)

*To all whom it may concern:*

Be it known that I, JOSEPH B. LOCKE, a citizen of the United States, residing at Portsmouth, in the county of Rockingham, State of New Hampshire, have invented certain new and useful Improvements in Milk-Pails; and I do hereby declare the following to be a full, clear, and exact description of the invention, such as will enable others skilled in the art to which it appertains to make and use the same.

This invention relates to milking-buckets; and it has for its object to provide a device of this nature in which the milk will be strained in its passage into the bucket and again strained while being poured from the bucket, a further object of the invention being to prevent the stream of milk from striking the strainer, and thus forcing dirt through it, and to provide means for arresting sediment when milk is poured from the pail or bucket.

A further object of the invention is to provide means whereby the bucket or pail may be held in proper position during the milking operation and without fatigue to the operator.

In the drawings forming a portion of the specification, and in which like numerals of reference indicate similar parts in the several views, Figure 1 is a top plan view of the bucket. Fig. 2 is a longitudinal section taken vertically of the bucket. Fig. 3 is a vertical section through a modified form of bucket. Fig. 4 is a top plan view of the modified form of bucket.

Referring now to the drawings, the present bucket consists of a downwardly-tapering body portion 5, to the upper edge or rim of which is soldered or otherwise secured a reentrant frusto-conical flange 6, at the central portion of which is an opening 7, leading into the bucket, and this opening is provided with a strainer 8, which is removably and slidably engaged with guides at the sides of the opening. In the milking operation the milk is directed against the flange, down which it runs, and through the strainer and the opening 7 into the bucket. To prevent the stream of milk striking the strainer direct, guard-walls 9 are provided.

Upon reference to Fig. 1 of the drawings it will be noted that the top of the bucket has the shape of a prolate ellipse, and through the flange at one end of the ellipse is formed an opening provided with a strainer 10, which is disposed slidably, so that it may be removed when desired, and leading from this opening and over the side of the bucket is an arcuate spout 12. The opening last referred to is spaced slightly from the bucket, so that in pouring milk from the bucket the sediment may collect below the opening, while the milk will be poured off. At the opposite side of the bucket from the spout is a similarly-shaped hook 13, and this spout and hook are arranged so that during the milking operation the spout and hook may be engaged over the knees of the operator to support the bucket, as distinguished from the usual method—that of squeezing the bucket between the knees. With this construction it will be seen that the spout serves a double purpose and that in the milking operation and the pouring off of the milk the milk is strained twice, so that it is free from sediment. A bail 14 is provided and the ends thereof are engaged with the sides of the bucket in the usual manner.

In Figs. 3 and 4 of the drawings there is shown a second form of the invention, including a body portion 20 of the same shape as the first-described bucket and to the outer face of which is secured an outwardly and then downwardly directed spout 21, having a straining-cap 22 at its outer end. Transversely of the upper portion of the bucket is secured a top section 23, through which is formed a slot 24, which leads to guideways 25 at the sides of the opening 26, with which the spout communicates, and this slot permits of insertion of a strainer-slide 27 to cover the inner end of the spout. The strainer may be thus easily applied and removed, so that cleaning of both the strainer and the spout are facilitated. Hinged to the straight edge of the cover-section or top section 23 is a second top or cover section, which completely closes the remaining portion of the upper end of the bucket and centrally of which is an opening 28, at the lower edge of which are flanges 29, forming a rest for a strainer 30, which is slid into place through a horizontal slot in the lower portion of a funnel 31, which is mounted upon the section 27'. To prevent direction of the streams of milk directly upon the strainer 27, baffle-plates 32 and 33 are secured within the funnel and are inclined so that the milk may readily drip therefrom. At the portion of the outer face of the body of the bucket at a point diametrically opposite to the spout is fixed a handle 35, which is the same in shape as the spout, and in addition to forming a handle forms a rest for engagement over a knee of the person milking, as is engaged also the spout in the same manner as above described. Below the handle 35 is a second handle 40.

It will be understood that in practice other modifications may be made and that any suitable materials and proportions may be used for the various parts without departing from the spirit of the invention.

What is claimed is—

1. A milking-bucket comprising a body portion having a reëntrant frusto-conical flange at its upper edge, and provided with an opening leading into the bucket, a strainer for said opening, an arcuate spout leading from the flange at one side of the bucket and curved downwardly over the side of the bucket, and an arcuate hook connected to the flange at the opposite side of the bucket and extending downwardly over the side of the bucket.

2. A milking-bucket comprising a body portion elliptical in horizontal section, a reëntrant flange at the upper edge of the bucket having a central opening leading into the bucket, a removable strainer for the opening, deflectors disposed to deflect milk from the strainer, said flange having a second opening adjacent to one end of the bucket, a spout leading from said opening outwardly and downwardly over the side of the bucket, and a hook at the opposite side of the bucket connected to the flange and extending outwardly and downwardly over the side of the bucket, the spout having a removable strainer at its inner end.

3. A milking-bucket having an arcuate outwardly and downwardly directed spout at one point and having a similarly-shaped handle at a diametrically opposite point, said spout and handle being adapted for engagement over the knees of a milker.

4. A milking-bucket having an opening leading into the top thereof and a funnel-shaped passage leading to the opening, a screen covering the opening, baffle-plates above the screen, and a spout having a removable screen at the inner end thereof.

In testimony whereof I hereunto sign my name, in the presence of two subscribing witnesses, on the 8th day of November, 1901.

JOSEPH B. LOCKE.

Witnesses:
  HORACE MITCHELL,
  A. M. MELOON.